United States Patent
Marchal et al.

(10) Patent No.: US 8,828,461 B2
(45) Date of Patent: Sep. 9, 2014

(54) **CYSTEINE GRANULES AND USE THEREOF AS *BIFIDOBACTERIUM ANIMALIS LACTIS* GROWTH STIMULANTS**

(71) Applicant: Compagnie Gervais Danone, Paris (FR)

(72) Inventors: Laurent Marchal, Villemoisson sur Orge (FR); Xavier Dhoosche, Fontenay aux Roses (FR)

(73) Assignee: Compagnie Gervais Danone, Paris (FR)

( * ) Notice: Subject to any disclaimer, the term of this patent is extended or adjusted under 35 U.S.C. 154(b) by 0 days.

(21) Appl. No.: 13/840,515

(22) Filed: Mar. 15, 2013

(65) Prior Publication Data

US 2013/0202739 A1 Aug. 8, 2013

Related U.S. Application Data

(63) Continuation of application No. 12/307,572, filed as application No. PCT/FR2007/000916 on Jun. 1, 2007, now abandoned.

(30) Foreign Application Priority Data

Jul. 13, 2006 (FR) ..................... 06 06421

(51) Int. Cl.
*A23C 9/13* (2006.01)
(52) U.S. Cl.
USPC ........................................... 426/43
(58) Field of Classification Search
CPC ........................................ A23C 9/13
USPC .............. 426/43, 42, 580, 582, 583
See application file for complete search history.

(56) References Cited

U.S. PATENT DOCUMENTS

| 7,008,785 | B2 | 3/2006 | Antoine et al. | |
|---|---|---|---|---|
| 2001/0049132 | A1* | 12/2001 | Kringelum et al. | 435/252.4 |
| 2008/0181986 | A1 | 7/2008 | Terragno et al. | |

FOREIGN PATENT DOCUMENTS

| EP | 0486 738 A1 | 5/1992 |
|---|---|---|
| FR | 2 855 182 A1 | 11/2004 |
| FR | 2888469 | 1/2007 |
| GB | 1 271 674 A | 4/1972 |

OTHER PUBLICATIONS

FR 2 888 469—(Jan. 19, 2007)—Machine Translation.*
Dave R. I. et al., "Ingredient Supplementation Effects on Viability of Probiotic Bacteria in Yoghurt," Journal of Dairy Science, American Dairy Science Association, vol. 81, No. 11, pp. 2804-2816, Nov. 1998.
Dechter T.H. et al., "Survivability and Beta-Galactosidase Activity of Bifidobacteria Stores at Low Temperatures," Food Biotechnology, vol. 12, No. 1/2, pp. 73-89, 1998.
Ruas-Madiedo, P. et al., "A bile salt resistant derivative of *Bifidobacterium animalis* ssp. *lactis* has an altered fermentation pattern when grown on glucose and maltose," Appl. Environ. Microbiol., 2005, vol. 71, pp. 6564-6470.
Molan, A. L. et al., "In vitro and in vivo evaluation of the prebiotic activity of water-soluble blueberry extracts," World J Microbiol Biotechnol, 2009, vol. 25, pp. 1243-1249.

* cited by examiner

*Primary Examiner* — Donald Tarazano
*Assistant Examiner* — Hamid R Badr
(74) *Attorney, Agent, or Firm* — Birch, Stewart, Kolasch & Birch, LLP

(57) ABSTRACT

The present application relates to an inoculum that is particularly suitable for the direct inoculation of at least one stran of *Bifidobacterium animalis* ssp. *lactis* in a dairy substrate, for the conversion of said dairy substrate into a fermented dairy product. This inoculum comprises, in mixture or in collection form, the L-cysteine base and at least one strain of *B. animalis lactis*. Said cysteine and said at least one strain of *B. animalis lactis* are each contained in, or in the form of frozen and/or lyophilizate granules. Advantageously, said cysteine is incorporated within the same granules or the same lyophilizate as the cells of *B. animalis lactis*.

16 Claims, 9 Drawing Sheets

CYSTEINE GRANULES AND USE THEREOF AS *BIFIDOBACTERIUM ANIMALIS LACTIS* GROWTH STIMULANTS

This application is a continuation of co-pending application Ser. No. 12/307,572 filed on Jan. 26, 2009, which is the National Phase application under 35 U.S.C. §371 of PCT International Application No. PCT/FR2007/000916 which has an International filing date of Jun. 1, 2007, which claims priority to French Application No. FR 06 06421 filed on Jul. 13, 2006. The entire contents of all applications listed above are hereby incorporated by reference.

FIELD OF THE INVENTION

The present invention relates to granules of cysteine and to their uses as growth stimulants for *Bifidobacterium animalis* ssp *lactis*.

PRIOR ART OF THE INVENTION

In the dairy products field, the probiotics market is burgeoning.

In order to propose products containing high levels of probiotic strains while providing advantageous organoleptic qualities, dairy professionals are confronted with problems with mixed fermentations which employ both technical or technological ferments as well as probiotic ferments.

Strains termed probiotic strains are represented by species which grow slowly on a dairy substrate (generation time 1 h to 2 h for *Bifidobacterium*), while technological ferments derive from yoghurt ferments which grow rather more rapidly (generation time 15 min to 30 min for *S. thermophilus* and *L. bulgaricus*).

A good compromise between the growth of technological ferments and probiotics is difficult to achieve; the majority of industry professionals favor the organoleptic aspect over the quantity of probiotic: generally, the probiotic population is between $10^6$ and $10^7$ cfu/g of fermented product.

Currently, the majority of health studies on such probiotics have been carried out using products containing a minimum of $10^8$ cfu/g of probiotic strains.

The search for a compound which can stimulate the growth of a probiotic is based on an in-depth knowledge of the strain as regards its nutritional requirements and the capacity of the dairy substrate to fulfill them.

Further, it has to be demonstrated that such compounds do not exert a negative effect and do not stimulate the growth of strains termed technical strains, that they are of food quality and that they do not degrade the organoleptic properties of the product.

Furthermore, the quantities of activator compounds which have to be used in order to provide stimulation and which satisfy the above constraints are generally very small as a proportion with respect to the dairy substrates.

Such doses (generally less than 100 mg/L) and the allowable tolerances are not compatible with the measurement systems and the modes of incorporation used to produce the dairy substrates, and so using such substances on an industrial scale is problematic.

The problem is further complicated when the technical strains employed have to function in the context of the symbiosis of several strains of lactic bacteria, as is the case with fermented milks which use a symbiotic fermentation of *S. thermophilus* and *L. bulgaricus* in addition to the lactic fermentation occurring with the probiotics.

Various tests have been carried out in the prior art in order to determine the conditions favoring the growth of probiotics. The majority of such tests have, however, been carried out on pure cultures of probiotic bacteria, without taking into account the possible presence and activity of other lactic strains during manufacture of the product in an industrial environment.

One solution has been described in French patent application FR-05 07529 filed on 15 Jul. 2005 in the name of Compagnie Gervais Danone: it proposes the use of a sulfur-containing amino acid as an activator for bifidobacteria.

The present application proposes an improvement which is especially adapted to strains of *Bifidobacterium animalis* ssp *lactis*. The present application thus proposes an inoculum which does not suffer from the disadvantages of the prior art, and which overcomes the problem of simple, safe and effective activation and/or stimulation of *B. animalis lactis* during the industrial production of a fermented dairy product with a probiotic value which is intended for human consumption, and more particularly a fermented dairy product which, in addition to the fermentation carried out by the probiotic *B. animalis lactis*, involves the symbiotic fermentation of *S. thermophilus–L. bulgaricus*.

SUMMARY OF THE INVENTION

The present invention relates to an improved inoculum of *Bifidobacterium animalis* ssp *lactis*, to the use of said inoculum, and to fermented dairy products obtained using said inoculum.

The inoculum of the invention is particularly adapted for direct inoculation of at least one strain of *B. animalis lactis* in to a dairy substrate, to transform said dairy substrate into a fermented dairy product which is suitable for human consumption, and more particularly into a fermented dairy product with a probiotic value containing at least one strain of *B. animalis lactis*.

The inoculum comprises, as a mixture or in the collective or "kit of parts" form, frozen granules and/or (a) lyophilisate(s), in which are a particular L-cysteine and at least one strain of *B. animalis lactis*.

The inventors have selected a particular form of cysteine, namely an L-cysteine which is in a form such that the granules and/or lyophilisate(s) produced from said cysteine have (once defrosted and/or re-dissolved) a pH which is at least 4. One example of a suitable L-cysteine is the L-cysteine which is usually known as cysteine base (the formula for which in its reduced form is $HSCH_2CH(NH_2)CO_2H$).

This particular form of cysteine is more effective than the other forms of cysteine which are usually used (generally, cysteine-HCl), in the form of cysteine hydrochloride monohydrate).

Despite the low solubility of the particular L-cysteine selected by the inventors, the inventors have succeeded in producing an inoculum in the form of frozen granules and/or lyophilisate(s) which combine or integrate cells of *B. animalis lactis* and this particular form of L-cysteine, without in any way damaging the physiological condition and/or the metabolism of *B. animalis lactis*.

In the "integrated" version of the inoculum of the invention, at least one granule or lyophilisate of the inoculum contains both cells of *B. animalis lactis* and this particular form of L-cysteine. In a "combined" version of the inoculum of the invention, a portion of the granules or a lyophilisate contains the particular L-cysteine of the invention, and another portion of the granules or another lyophilisate contains cells of *B. animalis lactis*.

The present invention thus proposes a combined or integrated inoculum of *B. animalis lactis* with a cysteine activator.

Remarkably, the inoculum of the invention can produce a population of said at least one strain of *B. animalis lactis* (or, if there are several, said strains of *B. animalis lactis*) which does not fall below $5 \times 10^7$ cfu, preferably not below $10^8$ cfu, per gram of fermented product, after at least 20 days, preferably at least 30 days storage of said fermented product at a temperature in the range 4° C. to 11° C. (see FIGS. 8 and 9).

The inoculum of the invention is particularly suitable for the production of fermented milk with a high probiotic value, since it can maintain very high levels of *B. animalis lactis* during storage of the product in refrigerated surroundings, and since the L-cysteine activator used is present in doses such that neither the *S. thermophilus*+*L. bulgaricus* symbiosis nor the organoleptic qualities of the fermented milk are negatively affected.

BRIEF DESCRIPTION OF THE FIGURES

In the present application, reference will be made to the following figures:

FIGS. 6 and 7: change of pH over time (in hours);

FIGS. 8 and 9: change in biomass (cfu/mL) over time (in days) during storage of fermented dairy product at 10° C.;

FIGS. 6 and 8: *Bifidobacterium animalis lactis* strain BB12® probiotic ferment:
dairy mix BB12® T=dairy mix inoculated to 0.5 g/L using a mixture of granules of technical ferments and reference granules of *Bifidobacterium* BB12® ferment (granules containing water instead of and in place of cysteine);
dairy mix BB12® G4=dairy mix inoculated as for BB12 T dairy mix, namely to 0.5 g/L using a mixture of granules of technical ferments and reference granules of *Bifidobacterium* BB12® ferment, but to which cysteine base has been added in the form of frozen granules distinct from the probiotic granules, such that a concentration of 7.5 mg/L of cysteine is added to the mix;
dairy mix BB12® G4I=dairy mix inoculated to 0.5 g/L using a mixture of granules of technical ferments and reference granules of *Bifidobacterium* BB12 ferment, said integrated granules of probiotic containing cysteine base, in order to add 7.5 mg/L of cysteine base to the mix;

FIGS. 7 and 9: *Bifidobacterium animalis lactis* I-2494 probiotic ferment:
dairy mix I-2494 T=dairy mix inoculated to 0.5 g/L using a mixture of granules of technical ferments and reference granules of *Bifidobacterium* I-2494 ferment (granules containing water instead of and in place of cysteine);
dairy mix I-2494 G4=dairy mix inoculated as for I-2494 T dairy mix, namely to 0.5 g/L using a mixture of granules of technical ferments and reference granules of *Bifidobacterium* I-2494 ferment, but to which cysteine base has been added in the form of frozen granules distinct from the granules of probiotic, such that a concentration of 7.5 mg//L of cysteine is added to the mix;
dairy mix I-2494 G4I=dairy mix inoculated to 0.5 g/L using a mixture of granules of technical ferments and reference granules of *Bifidobacterium* I-2494 ferment, said integrated granules of probiotic containing cysteine base in order to add 7.5 mg/L of cysteine base to the mix;

DETAILED DESCRIPTION

Some Definitions

Figure 1:
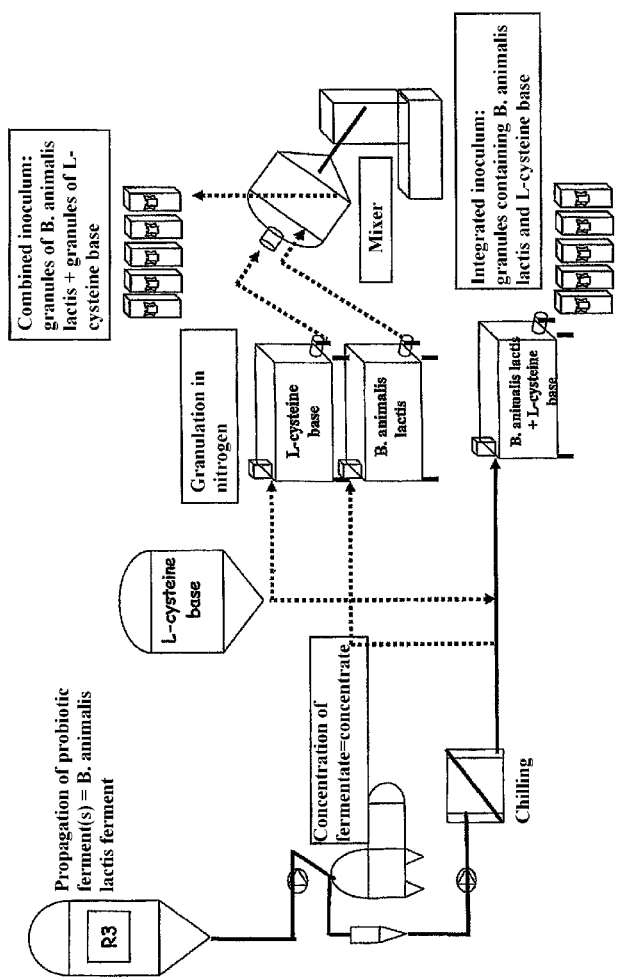
FIG. 1: flow diagram for:
the combined solution, which proposes producing granules of probiotic ferment(s) and granules of cysteine, said two types of granules being capable of being mixed together subsequently; and
the integrated solution, which proposes producing granules containing both probiotic ferment(s) and cysteine.

All of the terms used in the present application have the scope and meaning which are usually applied in the field of the dairy industry and/or the food industry.

Thus, when reference is made to "lactic fermentation", this pertains to acidifying lactic fermentation, which means acidification following the production of lactic acid which may be accompanied by the production of other acids, carbon dioxide and various substances such as exopolysaccharides (EPS) or aromatic substances, for example diacetyl and acetaldehyde.

Similarly, the term "lactic ferment" means a micro-organism or a strain of live or viable micro-organisms which is capable of bringing about such acidifying lactic fermentation on a dairy substrate.

The term "fermented milks" has the meaning which is usually applied in the dairy industry, i.e. products which are intended for animal consumption, more particularly human consumption, and which are derived from acidifying lactic fermentation of a dairy substrate. Such products may contain secondary ingredients such as fruits, vegetables, sugars, flavorings, etc.

The designation "fermented milk" satisfies strict official standards. Reference in this regard may be made to the Codex Alimentarius (prepared by the Codex Alimentarius Commission under the aegis of FAO and WHO and published by the Information Division of the FAO, available on line at http://codexalimentarius.net; see in particular volume 12 of the Codex Alimentarius, "Codex Standards for milk and milk products", and the standard "CODEX STAN A-11(a)-1975", the contents of which are hereby incorporated into the present application by reference).

Particular reference may be made to French Law n° 88-1203 dated 30 Dec. 1988 regarding fermented milks and yoghurt or yogurt published in the Official Journal of the French Republic dated 31 Dec. 1988. The contents of this law are hereby incorporated into the present application by reference.

The term "fermented milk" is thus reserved in the present application for the milk product prepared with a dairy substrate which has undergone a treatment which is at least equivalent to pasteurization, inoculated with micro-organisms belonging to a characteristic species or characteristic species of each product. Coagulation of "fermented milks" must not be accomplished by any means other than those resulting from the activity of the micro-organism employed.

A "fermented milk" has not undergone any treatment which can remove a constituent element of the milk substrate employed, and in particular, coagulum has not been removed.

A "fermented milk" may be supplemented with one or more flavor extracts, one or more natural flavors, as well as, with a limit of 30 per 100 by weight of finished product, one or more sugars and other food additives providing a particular taste, or even cereals.

The incorporation of fats and/or proteins of non-dairy origin as substituents is not permitted.

The quantity of free lactic acid contained in a fermented milk must not be less than 0.6 grams per 100 grams at the point of sale to the consumer, and the quantity of protein with respect to the milk portion must not be less than that of normal milk.

The term "dairy substrate" as used in the present application means "milk" as the term is understood in the dairy industry, i.e. a substrate essentially containing milk and/or milk components, with a composition such that lactic fermentation of said dairy substrate by strain(s) of lactic bacteria such as *S. thermophilus* and/or *L. bulgaricus* results in a product which may be destined for human food and more particularly which can be designated a fermented milk.

The term "dairy substrate" thus encompasses milk of animal origin in any form and in any compositional variation: skimmed or unskimmed milk, concentrated or non-concentrated milk, ultrafiltered or non-ultrafiltered milk, fresh milk or otherwise, powdered or non-powdered milk, reconstituted or non-reconstituted milk, recombined or non-recombined milk, milk enriched in milk constituents or otherwise, milk supplemented or not supplemented with processing agents or agents which enhance the quality of the finished product, such as taste agents, flavorings, sugars etc. As an example, a dairy substrate intended for the manufacture of fermented milks may comprise skimmed milk, cream and skimmed milk powder (see Example 1 below).

The term "dairy substrate" does not, however, include in its scope the designation "culture medium". The term "culture medium" envisages a medium intended to encourage and/or stimulate the growth of lactic bacteria, and thus to produce an inoculum of lactic bacteria, while the term "dairy substrate" envisages a medium which is intended to undergo transformation by fermentation, to produce a food intended for human consumption. Thus, many compounds which may be added to a culture medium to stimulate and/or to encourage the growth of lactic bacteria may not be added to a dairy substrate to obtain a fermented milk or yogurt.

This is particularly the case:

with many surfactants and/or emulsifying agents and/or solubilizing agents and/or detergents, such as polyoxyethylene-sorbitan-20-monooleate (also known as polysorbate 80 or Tween 80);

acids such as citrate or acetate type acids;

meat extracts;

plant peptones;

glycerophosphate.

The most frequently used lactic ferments include the following lactic bacteria:

*Streptococcus thermophilus* (for example, strain I-1630 available from CNCM); and

*Lactobacillus delbrueckii* ssp *bulgaricus*, or *Lactobacillus bulgaricus* (for example, strains I-1519 and I-1362 available from CNCM);

*Pediococcus acidilacti;*

*Leuconostocs*, such as:

*Leuconostoc cremoris;*

*Leuconostoc dextranicum;*

*Leuconostoc* lactis;

*Lactobacillus*, such as:

*Lactobacillus acidophilus* (for example, strain I-0967 available from CNCM);

*Lactobacillus casei* (for example, strain I-518 available from CNCM);

*Lactobacillus helveticus;*

*Lactobacillus delbrueckii* ssp *lactis* (for example, strain I-2843 available from CNCM);

*Lactococcus*, such as:

*Lactococcus cremoris;*

*Lactococcus lactis* ssp *lactis* (for example, strain I-1631 available from CNCM);

*Lactococcus lactis* ssp *lactis* biovar diacetylactis (for example, strain I-2806 available from CNCM);

*Bifidobacterium*, such as:

*Bifidobacterium animalis lactis* (for example, strain I-2494 available from CNCM, or the strain sold with reference BB12® by Chr. Hansen);

*Bifidobacterium breve;*

*Bifidobacterium bifidum;*

*Bifidobacterium longum;*

*Bifidobacterium infantis.*

Probiotic lactic bacteria are defined as live lactic bacteria which, when consumed in sufficient quantities, have beneficial effects to health which extend beyond their basic nutritional value (official definition from the World Health Organization).

Probiotic lactic bacteria comprise the following lactic bacteria in particular:

*Lactobacillus*, such as:
- *Lactobacillus acidophilus* (for example, strain I-0967 available from CNCM);
- *Lactobacillus casei* (for example, strain I-518 available from CNCM);
- *Lactobacillus helveticus*;
- *Lactobacillus delbrueckii* ssp lactis (for example, strain I-2843 available from CNCM);

*Bifidobacterium*, such as:
- *Bifidobacterium animalis lactis* (for example, strain I-2494 available from CNCM, or the strain sold with reference BB12® by Chr. Hansen);
- *Bifidobacterium breve*;
- *Bifidobacterium bifidum*;
- *Bifidobacterium longum*;
- *Bifidobacterium infantis*.

Probiotic lactic bacteria are not simple food additives which can simply be added in bulk to the dairy product. They are live bacteria which bring about acidifying fermentation the metabolism of which is affected by the conditions to which they are subjected during manufacture of the fermented milk product, then subsequently during storage of the fermented milk product up to the eat-by date (EBD).

Eat-by dates depend on the legally required storage periods fixed by legislation in force. For fresh fermented dairy products, such as fermented milks, the EBD is generally 30 days from the date of manufacture.

The term "ferment", either bacterial or technical strain, as used here means a ferment, bacterium or strain which participates in the structure and/or texture of the fermented dairy product as opposed to a ferment, bacterium or strain with an essentially probiotic function.

As an example, it is possible to produce a fermented milk by symbiotic *L. bulgaricus–S. thermophilus* fermentation, using in addition at least one strain of *B. animalis lactis* as the probiotic strain. In this case, the strains known as technical strains are the strains of *S. thermophilus* and *L. bulgaricus*.

Implementation and Aspects of the Invention

The invention concerns an inoculum which is particularly adapted to direct inoculation of at least one strain of *Bifidobacterium animalis* ssp lactis into a dairy substrate, to transform said dairy substrate into a fermented dairy product which is adapted for human consumption and which has a probiotic value as well as to the uses of said inoculum in the context of the production of such dairy products.

The inoculum of the invention is more particularly adapted to the production of a fermented dairy product which is obtained by fermentation of a dairy substrate by the probiotic *B. animalis lactis* and by *S. thermophilus–L. bulgaricus* symbiosis. Such a product thus contains at least one strain of *S. thermophilus*, at least one strain of *L. bulgaricus* and at least one strain of *B. animalis lactis* in the live form.

The inoculum of the invention comprises at least one strain of *B. animalis lactis*.

The inoculum of the invention comprises a particular cysteine, namely L-cysteine, which is in a form such that the granules and/or lyophilisate(s) which are obtained using this form of L-cysteine are such that the pH of the solution obtained after:
- defrosting said granule(s); and/or
- re-dissolving said lyophilisate(s) in a proportion of 1 to 2 grams of lyophilisate(s) per 8 to 10 mL of $H_2O$;

is at least 4.

Preferably, this pH does not exceed a pH of 8.

To this end, it is preferable to select an L-cysteine in a form such that it has a pH which is more than 4 when it is placed in solution. As an example, a solution containing 1.25 grams of this form of cysteine per 50 mL of $H_2O$ has a pH of 4.5 to 5.5.

One example of such a form of cysteine is the L-cysteine which is normally termed L-cysteine base (or L-cysteine in the base form). In its reduced form, L-cysteine base has the formula $HSCH_2CH(NH_2)CO_2H$.

L-cysteine base is not cysteine-HCl: it is thus neither a hydrochloride of cysteine nor a cysteine hydrochloride monohydrate.

The choice of this particular cysteine results from a selection made from among the various available forms of cysteine.

This particular cysteine can be assimilated by *B. animalis lactis* and is an activator for the growth of *B. animalis lactis* on a dairy substrate.

This particular cysteine is suitable for human consumption. It satisfies legislation relative to fermented dairy products intended for human consumption.

This particular cysteine can also stimulate growth, or at least the metabolism of *B. animalis lactis*, without perturbing the metabolism of other non-probiotic lactic bacteria and in particular without perturbing the symbiotic lactic fermentation exercised by *S. thermophilus* and *L. bulgaricus*.

In addition to all of these properties, this particular cysteine can produce an inoculum, termed integrated, which includes both said at least one strain of *B. animalis lactis* and cysteine in the same physical unit, without the growth, or at least the metabolism, of this strain of *B. animalis lactis* being negatively affected.

Highly preferably, the inoculum of the invention does not include cysteine in the acid form such as cysteine-HCl (L-cysteine hydrochloride with formula $HSCH_2CH(NH_2)CO_2H.HCl$).

The inoculum of the invention is in a particular physical form. It is in the form of frozen granules and/or lyophilisate(s).

This particular form of inoculum is particularly suitable for direct inoculation.

The choice of the particular cysteine mentioned above means that the inoculum can be manufactured with all of these features, and a particularly active inoculum can be obtained.

The choice of the particular L-cysteine of the invention means that said at least one strain of *B. animalis lactis* and said cysteine can be mixed together to produce frozen granules and/or lyophilisate(s) which comprise both said strain of *B. animalis lactis* and said cysteine in the same granules and/or in the same lyophilisate without the growth, or at least the metabolism, of said strain of *B. animalis lactis* being negatively affected.

Such results cannot be achieved using the cysteine in the acid form such as cysteine-HCl (hydrochloride of L-cysteine with formula $HSCH_2CH(NH_2)CO_2H.HCl$) instead of and in place of L-cysteine base.

The inventors thus propose a frozen granule or lyophilisate in which are found both cells of said at least one strain of *B. animalis lactis* and said particular L-cysteine. This frozen granule or lyophilisate may be qualified as an inoculum of *B. animalis lactis* with an integrated activator. This frozen granule or lyophilisate is a preferred embodiment of the invention.

An alternative to the pathway of integrating the activator may consist of not combining the activator in the same granule or lyophilisate with the strain of *B. animalis lactis*, but producing distinct frozen granules or lyophilisates.

As an example, it is possible to produce, for example in the form of a mixture or kit of parts:

frozen granules containing cells of said at least one strain of *B. animalis lactis* and distinct frozen granules containing said particular L-cysteine (=granules which are not integrated but are combined); or a lyophilisate containing cells of said at least one strain of *B. animalis lactis* and a lyophilisate containing said particular L-cysteine (=non-integrated but combined lyophilisates); or frozen granules containing cells of said at least one strain of *B. animalis lactis* and a lyophilisate containing said particular L-cysteine, or vice versa (=combination of granules and lyophilisate(s)) or a mixture of these alternatives.

These inoculums are direct alternatives to the integrated frozen granules or lyophilisate in that they consist in combining together the means of the invention but in distinct physical forms.

These inoculums are qualified here as "combined" and are encompassed within the scope of the present application.

FIG. 1 shows an illustration of the mode of production of integrated granules in accordance with the invention and of the mode of production of combined granules in accordance with the invention.

The invention thus results from a combination of selecting a particular cysteine (preferably L-cysteine base) and developing a particular physical form (frozen granules and/or lyophilisate(s)), which is specially adapted to direct inoculation.

The inoculum of the invention is also specially adapted to stimulating the growth of strains of *B. animalis lactis*. It cannot be adapted to stimulating other species or genuses of probiotic bacteria.

In order to stimulate the growth of strains of *B. animalis lactis*, a growth activator must be available which exerts a positive effect on the growth, or at least on the metabolism, of *B. animalis lactis* without in any way exerting a negative or deleterious effect on the texture nor on the structure nor on the health-giving and gustatory quality of the fermented dairy product obtained.

This problem is particularly difficult when fermented dairy products are to be produced which, in addition to *B. animalis lactis*, require the use of other lactic bacteria.

Each lactic bacterium employed does not necessarily have the same metabolism, and conditions favorable to one species or genus are not necessarily favorable to another species or another genus.

Thus, it may be difficult to find lactic fermentation conditions which are suitable for all of the strains involved.

This element is supplemented by the fact that lactic fermentation is constrained to a particular acidification kinetic/dynamic in order to be able to manufacture a good quality, safe fermented dairy product.

It is desirable to obtain a pH of 5.5 as rapidly as possible in order to limit the various contamination risks. However, rapid acidification kinetics run counter to good growth and/or good metabolism of *B. animalis lactis*.

The case of fermented milks obtained by fermentation of *S. thermophilus* and *L. bulgaricus* and also by fermentation of the probiotic *B. animalis lactis* is particularly difficult as, in addition to the fermentation of *B. animalis lactis*, a symbiotic lactic fermentation must be carried out which involves at least one strain of *Streptococcus thermophilus* and at least one strain of *Lactobacillus delbrueckii* ssp *bulgaricus*.

However, *B. animalis lactis* is a species which grows slowly on a dairy substrate (generation time of the order of 1 to 2 hours), while the technical ferments *S. thermophilus* and *L. bulgaricus* grow rapidly (generation time of the order of 15 to 30 min).

Under these circumstances, controlling all of these parameters is particularly difficult.

Thus, the inoculum of the invention is specially designed not to exert a negative effect on the fermentation which could be carried out by lactic bacterial strains termed technical strains, and in particular on the symbiotic fermentation of *Streptococcus thermophilus* and *Lactobacillus delbrueckii* ssp *bulgaricus*.

Thus, the inoculum of the invention is specially adapted for use in the context of producing a fermented milk which comprises at least one strain of *B. animalis lactis* as a probiotic strain and which is obtained by fermentation of a dairy substrate by at least one strain of *Streptococcus thermophilus* and at least one strain of *Lactobacillus delbrueckii* ssp *bulgaricus* in addition to the fermentation carried out by *B. animalis lactis*.

The inoculum of the invention satisfies various criteria and can produce a fermented dairy product with a high probiotic value and which is of exceptional quality.

However, the fact that the inoculum of the invention is optimized for the particularly complex problem posed by the symbiotic fermentation of *S. thermophilus* and *L. bulgaricus* in the presence of a fermentation of *B. animalis lactis* clearly does not prevent its use in less complex situations, such as that of fermentation of a dairy substrate which uses only one genus or species of lactic bacteria other than *B. animalis lactis* in addition to said at least one strain of *B. animalis lactis* or which uses only strains of *B. animalis lactis*.

One advantage of the inoculum of the invention is that it can produce a population of said at least one strain of *B. animalis lactis* (or if there are several, said strains of *B. animalis lactis*) which is substantially higher than that which would be obtained under the same conditions but using a conventional inoculum of the same strain of *B. animalis lactis* without a growth activator and is also substantially higher than that which would be obtained under the same conditions but using an inoculum from the same strain of *B. animalis lactis* and cysteine-HCl as a growth activator.

The inoculum of the invention can thus produce a population of said at least one strain of *B. animalis lactis* (or, if there are several, said strains of *B. animalis lactis*) which is at least $5 \times 10^7$ cfu per gram of fermented product at the end of fermentation, preferably at least $10^8$ cfu per gram of fermented product at the end of fermentation.

Remarkably, the inoculum of the invention has the advantage of being suitable for producing a population of said at least one strain of *B. animalis lactis* (or, if there are several, said strains of *B. animalis lactis*) which does not fall below $5 \times 10^7$ cfu per gram of fermented product, after at least 20 days, preferably at least 30 days of storage of said fermented product at a temperature in the range 4° C. to 11° C., preferably at a temperature in the range 4° C. to 10° C., highly preferably at a temperature in the range 4° C. to 9° C.

Figure 8:
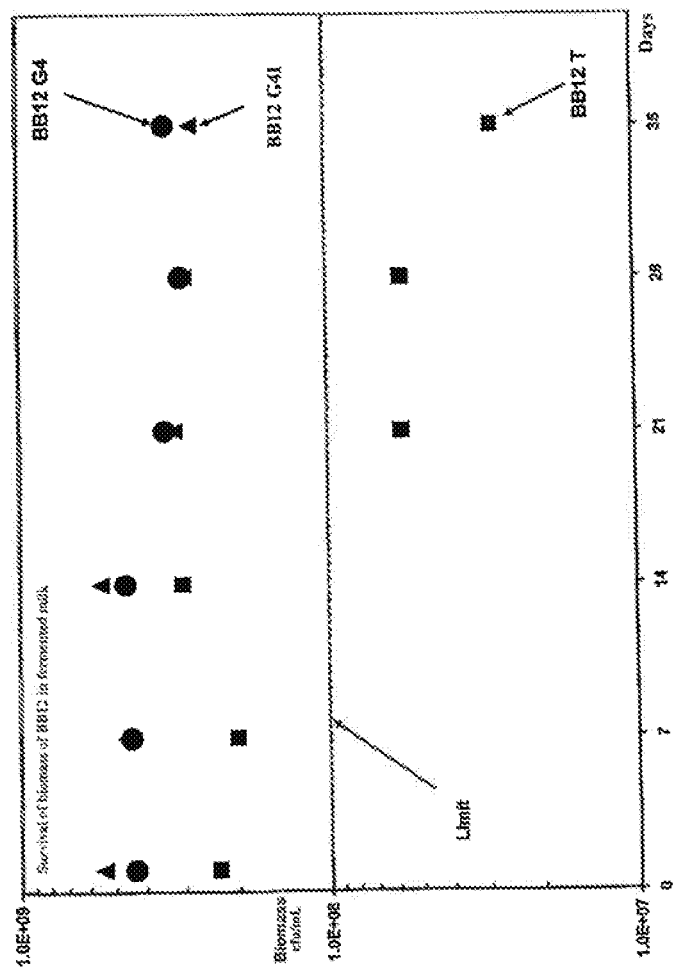
Figure 9:
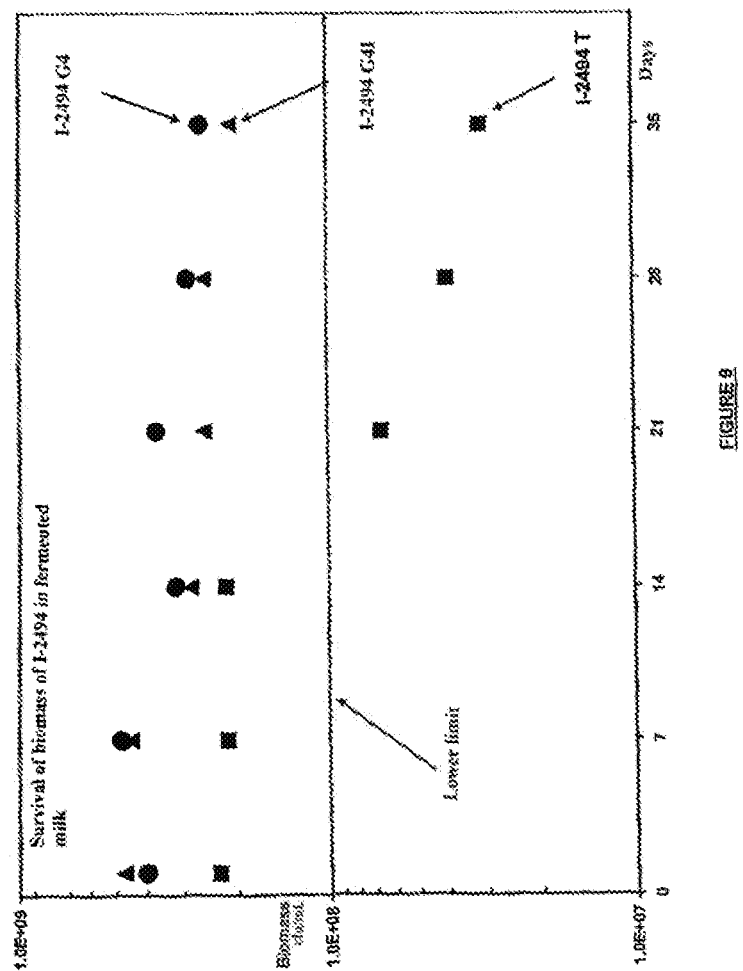

Particularly remarkably, the inoculum of the invention has the advantage of being able to produce a population of said at least one strain of *B. animalis lactis* (or, if there are several, said strains of *B. animalis lactis*) which does not fall below $10^8$ cfu per gram of fermented product after at least 20 days, preferably at least 30 days of storage of said fermented product at a temperature in the range 4° C. to 11° C., preferably at a temperature in the range 4° C. to 10° C., and highly preferably at a temperature in the range 4° C. to 9° C.: see FIGS. 8 and 9, showing that for at least 30 days of storage at 10° C., the population of *B. animalis lactis* in fermented milks (*S. ther-* mophilus–L. bulgaricus+B. animalis lactis) produced using an inoculum in accordance with the invention is maintained compared with reference fermented milks for which the population of B. animalis lactis fell rapidly from the 21$^{st}$ day.

Another advantage of the inoculum of the invention is that it is in a form which is suitable for use in an industrial context.

In fact, the inoculum of the invention is in an improved form which means that it can be used in a particularly safe and easy manner in the context of industrial production of a fermented dairy product.

The doses of growth activators and the accepted tolerances may sometimes be difficult to control as regards the systems for measurement and incorporation used to produce fermented dairy products in an industrial environment. As an example, an excess of activator, while it is beneficial to the probiotic strain, is generally highly deleterious to the quality of the fermented dairy product obtained: it may result in a poor flavor (for example a sulfurous taste for cysteine added in excess), or it may exert negative or deleterious effects on the fermentation of technical strains (this is, for example, the case for S. thermophilus when an excess of cysteine is used). The control of the quantities of activator added is also important for sanitary reasons as this control limits human intervention and the amount of modification to and adaptation of industrial lines where cleanliness must be absolutely guaranteed. Controlling the quantities of activator added is also clearly of economic importance.

It may thus be the case that the skilled person may have available a suitable growth activator but knows the difficulties encountered when using it on an industrial scale as controlling the quantity of activator added appears difficult in this context.

On the other hand, the inoculum of the invention is very easy to use in an industrial context and the quantity of activator used can be controlled safely and easily. The inoculum of the invention is thus easier to use, and means that fermented dairy products with excellent textural, structural and flavor qualities can be manufactured in an industrial environment effectively and reliably and contain the probiotic B. animalis lactis in a particularly high dose.

The inoculum of the invention is the result of a delicate compromise between:
the requirement to preserve the excellent qualities of the fermented dairy product for the consumer (structure, texture, health-giving qualities, gustatory qualities);
the desire to further increase the B. animalis lactis content in order to accentuate the probiotic effects of the product; and
the desire to provide an inoculum in an improved form which is particularly suited to direct inoculation and which can completely safely and simply control the quantities of the activators which are added.

The inoculum of the invention satisfies these various aims.

The inoculum of the invention comprises, as a mixture or in the form of a kit of parts:
at least one strain of B. animalis lactis; and
L-cysteine said to be in its free form (i.e. L-cysteine which is not bonded to other amino acids by a peptide linkage), said L-cysteine in the free form also being in a form such that it can produce granules and/or lyophilisate(s) which are such that the pH of the solution obtained after:
defrosting said granule(s); and/or
re-dissolving said lyophilisate(s) in a proportion of 1 to 2 grams of lyophilisate(s) per 8 to 10 mL of H$_2$O;
is at least 4.
Preferably, this pH does not exceed a pH of 8.

To this end, a free L-cysteine is preferably selected which is in a form such that it has a pH which is over 4 when it is placed in solution. As an example, a solution containing 1.25 grams of this form of cysteine per 50 mL of H$_2$O has a pH which is from 4.5 to 5.5.

A preferred example of such a form of cysteine is L-cysteine, also known as L-cysteine base (or L-cysteine in the base form). In the reduced form the formula of L-cysteine base is HSCH$_2$CH(NH$_2$)CO$_2$H.

Particular quantities of L-cysteine in accordance with the invention and of cells of B. animalis lactis contained in the inoculum of the invention are distributed in solid physical structures, namely frozen granules and/or (a) lyophilisate(s).

Said cysteine and said at least one strain of B. animalis lactis may be contained together in the same solid structure, or they may be present in distinct solid structures. These distinct solid structures may themselves be packaged separately but in a kit of parts, or they may be as a mixture.

Clearly, a mixture of a common solid structure containing both the particular L-cysteine of the invention and cells of B. animalis lactis, and distinct solid structures, may be produced.

Said cysteine and said at least one strain of B. animalis lactis may thus be:
together in the same frozen granules and/or in the same lyophilisate; and/or
separated, but in a kit of parts in distinct frozen granules and/or distinct lyophilisate(s).

Thus, and in accordance with an advantageous implementation of the invention, all or part of said particular L-cysteine and the B. animalis lactis cells may be together in the same frozen granules or in the same lyophilisate. The inoculum of the invention then comprises at least one frozen granule and/or a lyophilisate, which contains both the particular L-cysteine of the invention and B. animalis lactis cells.

Preferably, all of the particular L-cysteine and B. animalis lactis cells contained in the inoculum are together in the same frozen granules or in the same lyophilisate.

All or part of said particular L-cysteine of the invention and B. animalis lactis cells may be physically separated but collected into a kit of parts in distinct frozen granules and/or distinct lyophilisates. The inoculum of the invention then comprises:
at least two frozen granules; or
at least two distinct lyophilisates; or
at least one frozen granule and at least one lyophilisate;
each of which contains either the particular cysteine of the invention or cells of B. animalis lactis such that for each of said pairs of physical entities (granule+granule; or lyophilisate+distinct lyophilisate; or granule+lyophilisate):
one of the two physical entities contains all or part of said particular L-cysteine without containing B. animalis lactis cells; and
the other of the two physical entities contains cells of B. animalis lactis without containing said particular L-cysteine.

Clearly, all of the particular L-cysteine of the invention and all of the B. animalis lactis cells contained in the inoculum may thus be contained in or be in the form of distinct granule(s) and/or distinct lyophilisate(s).

The inoculum of the invention may thus comprise or be constituted by the following elements:
a) frozen granules containing a particular L-cysteine in accordance with the invention and cells of B. animalis lactis;
b) lyophilisate containing a particular L-cysteine in accordance with the invention and cells of B. animalis lactis;

c) frozen granules containing the particular L-cysteine of the invention but no cells of *B. animalis lactis*, and frozen granules containing cells of *B. animalis lactis* but no particular L-cysteine of the invention;
d) lyophilisate containing the particular L-cysteine of the invention but no cells of *B. animalis lactis*, and lyophilisate containing cells of *B. animalis lactis* but no particular L-cysteine in accordance with the invention;
e) frozen granules containing the particular L-cysteine of the invention but no cells of *B. animalis lactis*, and lyophilisate containing cells of *B. animalis lactis* but no particular L-cysteine of the invention;
f) lyophilisate containing the particular L-cysteine of the invention but no cells of *B. animalis lactis*, and frozen granules containing cells of *B. animalis lactis* but no particular L-cysteine of the invention;
g) or a mixture of at least two of the formulations presented in a) to f) above.

The inoculum of the invention contains cysteine said to be in the free form (i.e., not bound to other amino acids via a peptide linkage) which results from a particular selection carried out by the inventors.

Said cysteine in the free from is a free L-cysteine which, in addition, is in a form such that it can produce granules and/or lyophilisate(s) which are such that the pH of the solution obtained after:
defrosting said granule(s) (for example by placing the granules in a water bath at 37° C. for 3 min with manual stirring); and/or
re-dissolving said lyophilisate(s) in a proportion of 1 to 2 grams of lyophilisate(s) for 8 to 10 mL of $H_2O$ (for example with rehydration for 30 minutes at 25° C. with magnetic stirring);
is at least 4.

To this end, an L-cysteine is preferably selected which is in a form such that the pH of a solution constituted by 1 to 1.5 grams of said cysteine in 50 to 100 mL of $H_2O$ is at least 4.

One example of a suitable cysteine is L-cysteine, also known as L-cysteine base, the formula for which in the reduced form is $HSCH_2CH(NH_2)CO_2H$.

One example of an unsuitable cysteine is cysteine-HCl (cysteine hydrochloride, or cysteine hydrochloride monohydrate).

Preferably, none of the compounds used to manufacture the inoculum of the invention is in the hydrochloride form.

The particular L-cysteine of the invention which is contained in the inoculum of the invention is not a cysteine acid such as L-cysteine hydrochloride ($HSCH_2CH(NH_2)CO_2H.HCl$) or L-cysteine hydrochloride monohydrate ($HSCH_2CH(NH_2)CO_2H.HCl.H_2O$).

L-cysteine hydrochloride monohydrate is not a particular cysteine in accordance with the invention, since a solution constituted by 1.0 g of L-cysteine hydrochloride monohydrate in 100 mL of $H_2O$ has a pH of 1.5 to 2.0.

Thus, defrosting frozen granules or re-dissolving a lyophilisate which had been produced from a cysteine which was not a particular cysteine in accordance with the invention would result in a solution with a highly acidic pH, more particularly with a pH of less than 4, generally less than 3.5.

The majority of cysteines in the highly acidic form are cysteines in the form of salts such as L-cysteine hydrochloride or L-cysteine hydrochloride monohydrate. The ion or ions in this salt are not present in the frozen granules or lyophilisate. The presence of this ion or ions may thus occasionally constitute a marker for use of a cysteine which is combined with an acidic entity (which generally acts to increase the solubility of the cysteine). This is the case, for example, with the chloride ions contained in L-cysteine hydrochloride or L-cysteine hydrochloride monohydrate. In fact, if an acidic cysteine of L-cysteine hydrochloride or L-cysteine hydrochloride monohydrate were used, it would be observed that the granule or lyophilisate contained a large quantity of chloride (Cl) since L-cysteine hydrochloride monohydrate contains more than 19% chloride and that L-cysteine base generally contains less than 0.05%, more preferably less than 0.040%. The presence of a large quantity of chloride in the granule or lyophilisate may thus constitute an indirect marker of the use of a cysteine which is not a cysteine base. Thus, the form of cysteine used in an inoculum of the invention will generally provide less than 60 micrograms of chlorine ions per gram of granules with a dry matter content of 16-17%.

However, the first criterion which is applicable is that of pH. Measuring the pH in fact constitutes a direct criterion for detecting the presence of a particular cysteine of the invention: the pH of the defrosted granules or the re-dissolved lyophilisate is then at least 4. It is generally at least 5, for example in the range 5 to 6.5. Preferably, said pH does not exceed a pH of 8.

A pH which is at least 4 and at most 8 is not stressful for *B. animalis lactis*. *B. animalis lactis* may thus be mixed into the cysteine solution without being subject to stress, and be formulated into frozen granules or lyophilisate which integrates cysteine and *B. animalis lactis* cells within a solid physical structure. The *B. animalis lactis* inoculum which results then contains cells of *B. animalis lactis* which are in a good physiological and/or metabolic condition, and which respond rapidly to the activation exerted by the cysteine.

An "integrated" frozen granule or a lyophilisate of the invention which contains both cells of *B. animalis lactis* and a particular L-cysteine of the invention is thus a particularly improved *B. animalis lactis* inoculum in that it succeeds in integrating a *B. animalis lactis* activator into its structure without in any way altering the physiological and/or the metabolic state of the *B. animalis lactis* cells.

Selecting the particular L-cysteine of the invention means that granules and/or lyophilisates can be obtained which are more effective than granules and/or lyophilisate formulated from L-cysteine in the highly acidic form, such as L-cysteine hydrochloride, would be.

Further, this selection can integrate the cysteine in an effective manner into the same frozen granules or into the same lyophilisate. When cysteine is used in a highly acidic form such as L-cysteine hydrochloride to formulate a frozen granule or a lyophilisate which comprises both cysteine-HCl and *B. animalis lactis* cells, the resulting integrated granule or integrated lyophilisate is a less effective inoculum of *B. animalis lactis* compared with the same granule or lyophilisate obtained starting from the particular L-cysteine of the invention.

In accordance with a preferred implementation of the invention, the inoculum of the invention thus does not include a highly acidic cysteine and more particularly no L-cysteine hydrochloride and/or is not manufactured from such a cysteine.

The inoculum of the invention is also not intended to include cystine. Preferably, then, no cystine is added to the inoculum of the invention. However, traces of cystine may be found but they would, for example, be the results of oxidation of the cysteine contained in the inoculum.

Advantageously, said particular L-cysteine of the invention is present in the inoculum in a quantity of:

1 gram per $1\times10^{14}$ cfu of said at least one strain of *B. animalis lactis* (or, if there are several, said strains of *B. animalis lactis*);

to 1 gram per $3.5\times10^{10}$ cfu of said at least one strain of *B. animalis lactis* (or, if there are several, said strains of *B. animalis lactis*);

and/or in a quantity of:

0.01 milligrams per billion cfu of said at least one strain of *B. animalis lactis* (or, if there are several, said strains of *B. animalis lactis*);

to 30 grams per billion cfu of said at least one strain of *B. animalis lactis* (or, if there are several, said strains of *B. animalis lactis*).

In the present application, all of the cysteine masses are calculated on the basis of a cysteine with formula $HSCH_2CH(NH_2)CO_2H$.

Preferably, said particular L-cysteine of the invention is present in said inoculum in a quantity of:

1 gram per $0.2\times10^{14}$ cfu of said at least one strain of *B. animalis lactis* (or, if there are several, said strains of *B. animalis lactis*);

to 1 gram per $3.5\times10^{10}$ cfu of said at least one strain of *B. animalis lactis* (or, if there are several, said strains of *B. animalis lactis*);

and/or in a quantity of:

0.05 milligrams per billion cfu of said at least one strain of *B. animalis lactis* (or, if there are several, said strains of *B. animalis lactis*);

to 10 grams per billion cfu of said at least one strain of *B. animalis lactis* (or, if there are several, said strains of *B. animalis lactis*).

In accordance with a particular implementation of the invention, said particular L-cysteine of the invention is present in said inoculum in a quantity of 4.90 mg to 144 mg per $5\times10^9$ to $5\times10^{11}$ cfu of said at least one strain of *B. animalis lactis*.

Preferably, said particular L-cysteine of the invention is present in said inoculum in a quantity of 25 to 50 mg, more preferably 30 to 40 mg, still more preferably 31 to 39 mg, for example approximately 31, 32, 33, 34, 35, 36, 37, 38, 39 mg, highly preferably 35 to 37 mg, for example approximately 35, 36, 37 mg, and particularly preferably approximately 36.9 mg per $5\times10^9$ to $5\times10^{11}$ cfu of said at least one strain of *B. animalis lactis*.

Preferably, the number of cfu of *B. animalis lactis* is $5\times10^9$ to $5\times10^{11}$ cfu, more preferably $2\times10^{10}$ to $5\times10^{11}$ cfu of *B. animalis lactis*, highly preferably $2\times10^{10}$ to $1\times10^{11}$ cfu of *B. animalis lactis*, still more preferably $2\times10^{10}$ to $7\times10^{10}$ cfu of *B. animalis lactis*.

Advantageously, 1 gram of granules in accordance with the invention, which would comprise 16-17% dry matter (dry matter at 105° C. for at least 40 min), comprises $5\times10^9$ to $5\times10^{11}$ cfu of at least one strain of *B. animalis lactis*.

Advantageously, 1 gram of granules in accordance with the invention which would comprise 16-17% dry matter (dry matter at 105° C. for at least 40 min) comprises 4.90 mg to 144 mg of said particular L-cysteine of the invention, preferably L-cysteine base.

Advantageously, a quantity of 160 to 170 milligrams of a lyophilisate of the invention comprises $5\times10^9$ to $5\times10^{11}$ cfu of said at least one strain of *B. animalis lactis*.

Advantageously, a quantity of 160 to 170 milligrams of a lyophilisate of the invention comprises 4.90 mg to 144 mg of said particular L-cysteine of the invention.

In order to enumerate the colony forming units (cfu) of *B. animalis lactis*, it is possible to use any technique which the skilled person deems appropriate, for example the *Bifidobacterium* enumeration process described by Grand et al, 2003 (Eur Food Res Technol 217, 90-92). Preferably, the process described by S N Thitaram, G R Siragusa and A Hinton, 2005 (Jr Letters in Applied Microbiology, volume 41, page 355—October 2005; "*Bifidobacterium*-selective isolation and enumeration from chicken caeca by a modified oligosaccharide antibiotic-selective agar medium".

In order to assay the cysteine contained in a liquid, it is possible to use any technique which the skilled person deems appropriate, for example gas chromatography coupled with mass spectrometry, or high performance liquid chromatography coupled with fluorimetric detection. It is also possible to assay the cysteine using an amino acid analyzer such as the L-8800 High Speed Amino Acid Analyzer (Hitachi High Technologies).

Preferably, the inoculum of the invention does not include more than 0.5% (w/w) of yeast, yeast extract or yeast autolysate.

Preferably, the inoculum of the invention does not include more than 0.5% (w/w) of yeast, yeast extract or yeast autolysate. Highly preferably, said inoculum contains no yeast, yeast extract or yeast autolysate.

Advantageously, the invention allows an inoculum of *B. animalis lactis* to be formulated with is highly active and which generates a population of *B. animalis lactis* which is maintained over time (during storage of the fermented milk product at refrigeration temperatures) without having to use a preservative in the inoculum and without having to add a preservative to the milk substrate or to the fermented milk product.

Thanks to the invention, the *B. animalis lactis* population is in the fermented milk product in a particular healthy physiological and/or metabolic condition, which means that it can be maintained at high levels.

The inoculum of the invention comprises at least one strain of *B. animalis lactis*, for example, strain I-2494 or strain BB12® from Chr. Hansen.

The inoculum of the invention may clearly comprise several strains of *B. animalis lactis*, for example strain I-2494 or strain BB12® from Chr. Hansen.

The inoculum of the invention may also comprise at least one strain of lactic bacteria other than *B. animalis lactis*.

Said at least one other strain of lactic bacteria may be present in the granules or lyophilisate(s) which contain the cells of *B. animalis lactis* and/or the particular L-cysteine of the invention.

Said at least one other strain of lactic bacteria may be present in a physical structure which is distinct from that which contains the cells of *B. animalis lactis*. This distinct physical structure may, for example, be a solid structure, such as frozen granules or a lyophilisate which are mixed with the granules and/or lyophilisate(s) of *B. animalis lactis* and particular L-cysteine of the invention, or which are separated but in a kit of parts. This at least one other strain of lactic bacteria may, for example, be present in the form of frozen granules or a lyophilisate which are (is) distinct from the granules or lyophilisate(s) of *B. animalis lactis* and particular cysteine of the invention.

This at least one other strain of lactic bacteria may be a strain of *Bifidobacterium* or a strain of another genus.

This strain of a different genus may be a strain with a probiotic function, for example at least one strain selected from *Lactobacillus acidophilus, Mactobacillus thamnosus, Lactobacillus casei.*

This strain of a different genus may be a strain with a technical function, such as *S. thermophilus* and/or *L. bulgaricus*.

Advantageously, said inoculum of the invention comprises, in addition to the granule(s) and/or lyophilisate(s) of *B. animalis lactis* and particular L-cysteine, an inoculum of *S. thermophilus* and *L. bulgaricus*, for example in the form of frozen granule(s) and/or lyophilisate(s) adapted for direct inoculation.

Preferably, the inoculum of the invention comprises several strains other than *B. animalis lactis*, for example at least two, at least three, or at least four strains other than *B. animalis lactis*.

Advantageously, said other strains are at least one strain of *S. thermophilus* (for example, strain I-1630 available from CNCM) and at least two strains of *L. bulgaricus* (for example, strains I-1632 and I-1519 available from CNCM). Such an inoculum may be in the form of a mixture or a kit of parts collection of frozen granules and/or lyophilisate(s) containing *B. animalis lactis* and particular L-cysteine of the invention, and frozen granules and/or lyophilisate(s) containing *S. thermophilus* and/or *L. bulgaricus*. The ensemble is thus particularly suitable for direct inoculation of a dairy substrate with a view to transformation thereof by acidifying symbiotic *S. thermophilus'L. bulgaricus* lactic fermentation and by fermentation of *B. animalis lactis* to form a fermented milk with a high probiotic value and which maintains its high probiotic value during storage in a refrigerated medium.

The present application is also relevant to an integrated granule of the invention per se and to an integrated lyophilisate of the invention per se.

As indicated and described above, and/or in the examples section below, an integrated granule or lyophilisate in accordance with the invention comprises at least one strain of *B. animalis lactis* and the particular L-cysteine of the invention in the doses and/or proportions indicated. Preferably, said granule or lyophilisate does not comprise cysteine in the highly acidic form such as L-cysteine monochlorate.

The present application is thus relevant to a frozen granule which comprises at least one strain of *B. animalis lactis*, and to L-cysteine which is not bound to other amino acids by a peptide linkage, said L-cysteine being in a form such that the pH of the solution obtained after defrosting said granule(s) is at least 4, generally more than 5.

The present application is thus relevant to a lyophilisate which comprises at least one strain of *B. animalis lactis* and L-cysteine which is not bonded to other amino acids by a peptide linkage, said L-cysteine being a cysteine in a form such that the pH of the solution obtained after re-dissolving said lyophilisate(s) in a proportion of 1 to 2 grams of lyophilisate(s) per 8 to 10 mL of $H_2O$ is at least 4, generally more than 5.

Preferably, the pH of the granule or lyophilisate is less than 8 (pH of the solution obtained after defrosting the granules or re-dissolving the lyophilisate).

The invention is also relevant to uses of the inoculum of the invention.

More particularly, the invention is relevant to its uses in the context of acidifying lactic fermentation, and still more particularly to its uses in the context of manufacture of fermented milk products intended for human consumption.

The invention is thus relevant to any process which uses at least one inoculum and/or at least one granule or lyophilisate in accordance with the invention.

More particularly, the invention envisages a process for stimulating the growth and/or metabolism of *B. animalis lactis* on a dairy substrate, which employs at least one inoculum and/or at least one granule and/or at least one lyophilisate in accordance with the invention.

This stimulation process has the advantage of stimulating *B. animalis lactis* in a highly effective manner. As shown above, and as illustrated below, the stimulation process of the invention can produce a population of *B. animalis lactis* the metabolism and/or growth of which can maintain live *B. animalis lactis* cells over time.

In order to carry out this process, said inoculum is added in the doses and/or proportions indicated above and/or described in the examples and figures below.

Advantageously, said inoculum and/or granule and/or lyophilisate of the invention is added in quantities which supply to the dairy substrate:

5 to 20 mg of cysteine per liter of dairy substrate, preferably 6 to 15 mg/L, more preferably 7 to 11 mg/L; and $10^9$ to $10^{11}$ cfu of *B. animalis lactis* per liter of substrate, preferably $0.4 \times 10^{10}$ to $1 \times 10^{11}$ cfu of *B. animalis lactis*, more preferably $0.4 \times 10^{10}$ to $1.2 \times 10^{10}$ cfu of *B. animalis lactis*, highly preferably $0.4 \times 10^{10}$ to $1 \times 10^{10}$ cfu of *B. animalis lactis*.

The inoculated substrate is preferably maintained under temperature and atmospheric conditions which are favorable to the metabolism of *B. animalis lactis*, for example 37° C. to 42° C. in a closed receptacle.

The invention also envisages a process for producing a fermented dairy product, preferably a dairy product obtained by lactic fermentation, which lactic fermentation comprises at least symbiotic *S. thermophilus–L. bulgaricus* fermentation in addition to the fermentation carried out by *B. animalis lactis*.

The process of the invention comprises using at least one inoculum and/or at least one granule and/or at least one lyophilisate in accordance with the invention. The fermented dairy product obtained is a fermented dairy product with a high probiotic value as it contains a large amount of *B. animalis lactis* and has a high content during storage in a refrigerated atmosphere.

This production process has the advantage of activating and/or stimulating *B. animalis lactis* in a highly effective manner. It also has the advantage of not exerting a negative effect on the symbiosis of *S. thermophilus* and *L. bulgaricus*.

As presented above, and as illustrated below, the production process of the invention can produce a population of *B. animalis lactis* the metabolism and/or growth of which allows live cells of *B. animalis lactis* to be maintained over time.

In order to carry out this process, said inoculum is added in doses and/or proportions as indicated above and/or described in the following examples and figures.

Advantageously, said inoculum and/or granule and/or lyophilisate of the invention is added in quantities which add to the dairy substrate:

5 to 20 mg of cysteine per liter of dairy substrate, preferably 6 to 15 mg/L, more preferably 7 to 11 mg/L; and $10^9$ to $10^{11}$ cfu of *B. animalis lactis* per liter of substrate, preferably $0.4 \times 10^{10}$ to $1 \times 10^{11}$ cfu of *B. animalis lactis*, more preferably $0.4 \times 10^{10}$ to $1.2 \times 10^{10}$ cfu of *B. animalis lactis*, highly preferably $0.4 \times 10^{10}$ to $1 \times 10^{10}$ cfu of *B. animalis lactis*.

Doses of 0.05 g to 1 gram of integrated granules in accordance with the invention, for example approximately 0.2 g of integrated granules in accordance with the invention, are examples of appropriate doses for 1 liter of dairy substrate.

The inoculated substrate is preferably maintained under conditions of temperature and atmosphere which are favorable to the metabolism of *B. animalis lactis*, for example 37° C. to 42° C. in a closed receptacle.

Said at least one strain of *B. animalis lactis* acts as a probiotic strain. However, said at least one strain of *B. ani-

*malis lactis* must also be capable of carrying out acidifying fermentation of the dairy substrate. Said at least one strain of *B. animalis lactis* is thus not simply added to the substrate or dairy product without allowing it to carry out acidifying fermentation as a simple additive would be.

Advantageously, the process for producing the fermented parallel product may comprise using at least one strain other than said at least one strain of *B. animalis lactis.*

Said other strain is preferably a strain of lactic bacteria.

Said at least one other strain of lactic bacteria has the function of carrying out an acidifying lactic fermentation. It is thus inoculated into the dairy substrate in a manner such that it carries out acidifying lactic fermentation, i.e. at a moment and in quantities which allow it to carry out an acidifying lactic fermentation effectively.

The fermentation process of the invention thus corresponds to mixed fermentation carried out by said at least one strain of lactic bacteria and by said at least one strain of *B. animalis lactis*, and not to a simple lactic fermentation process in which *B. animalis lactis* would be added as a simple additive without any detectable fermentation action.

Said at least one strain of lactic bacteria and said at least one strain of *B. animalis lactis* are thus present together in the dairy substrate.

In accordance with an advantageous aspect of the invention, the production process may thus not be a two-step process: adding said at least one strain of *B. animalis lactis* and any other strains of lactic bacteria may be carried out at the same time, or at least substantially at the same step of the process, namely at the start of the process, without having to wait and check that the fermentation undertaken by one of the strains has happened at a particular stage, in order to decide to add the other strain or strains.

Fermentation of the dairy substrate is carried out at a temperature which is appropriate for the strains employed, and is generally carried out at a temperature in the range 36° C. to 42° C.

Said fermentation is generally carried out until a pH in the range 4.8 to 4.2 is reached.

The process for producing a fermented dairy product of the invention may also comprise one or more other steps, for example one or more other steps selected from conventional steps for producing the fermented dairy product concerned.

It may, for example, be one or more steps from the following steps:
preparing a dairy substrate;
heat treating the dairy substrate (heat treatment at least equivalent to pasteurization, for example 95° C. for 5 min);
one or more inoculations of the dairy substrate;
carrying out at least one lactic fermentation of the inoculated substrate under conditions adapted to the inoculated strains (to a pH of 4.8 to 4.2 in general);
optionally adding flavors, fruit, sweeteners, colorants, preservatives;
optionally, smoothing or stirring the fermented product;
packaging the fermented product, for example into hermetically sealed receptacles;
storing the fermented dairy product in refrigerated surroundings.

The inoculum of the invention can thus produce a population of said at least one strain of *B. animalis lactis* (or, if there are several, said strains of *B. animalis lactis*) which is at least $5 \times 10^7$ cfu per gram of fermented product at the end of fermentation, preferably at least $10^8$ cfu per gram of fermented product at the end of fermentation.

Remarkably, the inoculum of the invention has the advantage of being suitable for producing a population of said at least one strain of *B. animalis lactis* (or, if there are several, said strains of *B. animalis lactis*) which does not fall below $5 \times 10^7$ cfu per gram of fermented product, after at least 20 days, preferably at least 30 days of storage of said fermented product at a temperature in the range 4° C. to 11° C., preferably at a temperature in the range 4° C. to 10° C., highly preferably at a temperature in the range 4° C. to 9° C.

Particularly remarkably, the inoculum of the invention has the advantage of being suitable for producing a population of said at least one strain of *B. animalis lactis* (or, if there are several, said strains of *B. animalis lactis*) which does not fall below $10^8$ cfu per gram of fermented product, after at least 20 days, preferably at least 30 days of storage of said fermented product at a temperature in the range 4° C. to 11° C., preferably at a temperature in the range 4° C. to 10° C., highly preferably at a temperature in the range 4° C. to 9° C.: see FIGS. 8 and 9, illustrating maintenance at up to at least 30 days of storage at 10° C. of the population of *B. animalis lactis* in fermented milks produced using an inoculum in accordance with the invention (*S. thermophilus–L. bulgaricus+B. animalis lactis*) compared with reference fermented milks where the population of *B. animalis lactis* drops rapidly from the 21st day.

In the present application, the term "masses of the fermented dairy product" means the mass of the lactic portion of the fermented dairy product.

The present application is also relevant to the fermented dairy product per se.

Such a product has a population of *B. animalis lactis* which maintains itself above that observed in prior art products, even after at least 20 days, preferably at least 30 days of storage of said fermented product at a temperature in the range 4° C. to 11° C., preferably at a temperature in the range 4° C. to 10° C., highly preferably at a temperature in the range 4° C. to 9° C.

Its composition thus necessarily differs from prior art products.

Thus, the present application is relevant to a fermented dairy product which can be obtained by lactic fermentation of a dairy substrate by at least one inoculum in accordance with the invention to a pH which is generally in the range 4.8 to 4.2. Preferably, said inoculum is in the form of integrated frozen granules and/or an integrated lyophilisate of the invention (inoculum in which the particular L-cysteine is integrated with the *B. animalis lactis* ferment). Advantageously, said inoculum may also comprise at least one strain of *S. thermophilus* and/or at least one strain of *L. bulgaricus*.

In the present application, the acronym CNCM denotes the Collection Nationale de Cultures de Microorganismes [National Collection of Microorganism Cultures](Institut Pasteur; 25, rue du Docteur Roux; F-75724 PARIS CEDEX 15). Strains deposited with the CNCM carry a number commencing with "I-", such as "I-2494" (*B. animalis lactis* strain), "I-1630" (*S. thermophilus* strain), "I-1632" or "I-1519" (strains of *L. bulgaricus*).

The term "comprising", which is synonymous with "including" or "containing", is an open-ended term and does not exclude the presence of one or more additional element(s), ingredient(s) or step(s) which would not be explicitly indicated, while the term "consisting" or "constituted" is a closed term which excludes the presence of any other additional element, step or ingredient which has not been explicitly defined. The term "essentially consisting" or "essentially constituted" is a partially open-ended term which does not exclude the presence of one or more additional element(s), ingredient(s) or step(s) provided that those additional element(s), ingredient(s) or step(s) do not materially affect the basic properties of the invention.

As a result, the term "comprising" (or "comprise(s)") includes the terms "consisting", "constituted" as well as the terms "essentially consisting" and "essentially constituted".

The contents of each of the documents, works or publications which are cited in the present application are incorporated herein by reference.

The following examples are given purely by way of illustration and do not in any way limit the invention.

EXAMPLES

Example 1

Using Cysteine-HCl is not Suitable for the Manufacture of Granules Termed "Integrated" Granules which would Comprise Both Cysteine and *B. Animalis Lactis*

Process and Apparatus

Figure 2:
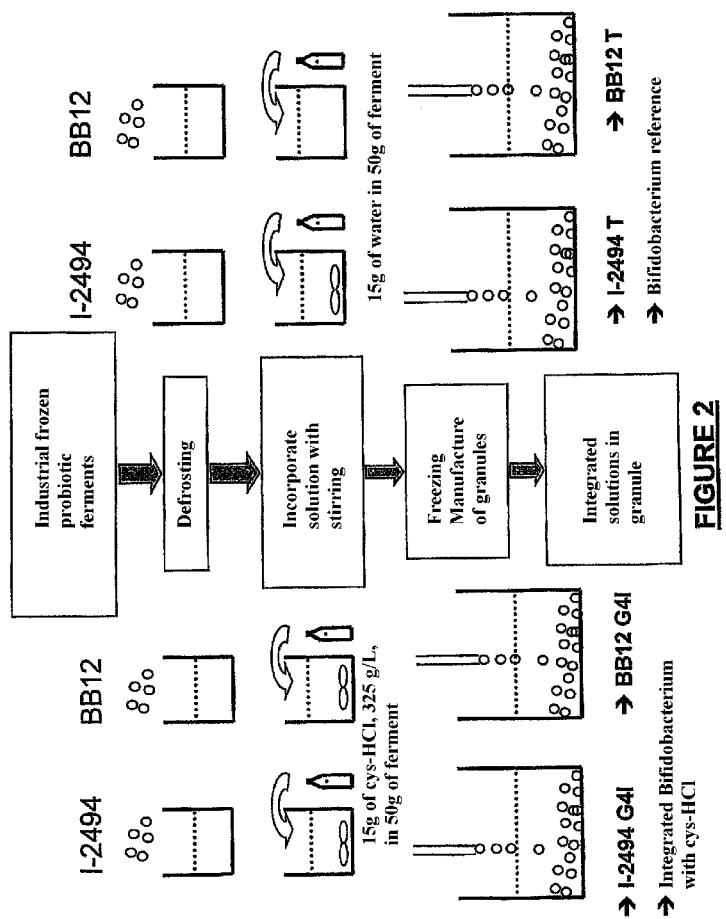
FIG. 2: flow diagram for the production of integrated granules (cysteine-HCl+probiotic ferment(s)): *Bifidobacterium animalis lactis* strain I-2494 or strain BB12® ferment, formulated into integrated granules, containing both probiotic ferment and cysteine, the cysteine here being cysteine-HCl.

In this example, the granule manufacturing principle shown in FIG. 2 was followed.

The following probiotic strains were used in this example:

*Bifidobacterium animalis lactis* strain BB12® sold by Chr Hansen A/S, Hoersholm, Denmark;

*Bifidobacterium animalis lactis* strain I-2494 available from the CNCM (date of deposit with CNCM=20 Jun. 2000); see International patent application WO-02/02800 filed on 4 Jul. 2001 in the name of Compagnie Gervais Danone and the national and regional counterparts of this international application; more particularly as regards the US counterparts of this international application, see U.S. Pat. No. 7,008,785B2.

If necessary, the strains were defrosted before use.

The cysteine used was cysteine-HCl, which is normally used to provide cysteine because of its very good solubility (approximately 110 g per 100 g of $H_2O$ at 20° C.).

Cysteine-HCl is the monohydrated hydrochloride of L-cysteine (or the monohydrated mono-hydrochloride of (R)-2-amino-3-mercaptopropionic acid). Its formula is $C_3H_7NO_2S.HCl.H_2O$ (or L-cysteine.HCl.$H_2O$). Its CAS number is 7048-04-6; it has a molar mass of 175.63.

Cysteine-hydrochloride is commercially available, for example from Ajinomoto Aminoscience LLC, Raleigh N.C. 27610, USA.

Process for producing granules (see FIG. 2):

50 grams of each strain of *B. animalis lactis* was mixed with:

15 grams of cysteine-HCl at 325 g/L (G4I Cys-HCl integrated granules); or 15 grams of water (reference granules I-2494 T and BB12 T).

Mixing was carried out by stirring in order to incorporate the cysteine-HCl solution properly (or water in the case of the references).

Frozen granules were produced by dropping the mixture into liquid nitrogen. A device comprising several syringe needles connected to a peristaltic pump via a tube was supplied with the mixture and the droplets formed at the needle ends were allowed to fall into an isothermal vessel filled with liquid nitrogen.

Frozen granules of G4I Cys-HCl probiotic ferment (granules of *B. animalis lactis* I-2494 or BB12® containing cysteine-HCl) and reference granules containing water instead of and in place of cysteine-HCl were obtained.

Preparation of Dairy Mixes (=Dairy Substrates):

The dairy mix was composed of the following ingredients: skimmed milk containing 0% of fat, cream containing 40% fat and skimmed milk powder (SMP) containing 33% protein.

Firstly, all of the ingredients were combined together to standardize the milk to a protein content (PC) of 4.4%, a fat content (FC) of 3.5% and a dry matter content of 15.8% with stirring of the medium for 60 minutes at approximately 750 rpm with a HEIDOLPH® stirrer in order to re-hydrate the proteins.

The standardization was checked using a MILKOSCAN FT 120® infrared detector from FOSS®. An example of the quantities of each ingredient required to obtain the target characteristics of milk is given below.

TABLE 1

| Ingredients | % |
|---|---|
| Skimmed milk 0% FC | 87.5 |
| Cream, 40% FC | 8.7 |
| Skimmed milk proteins, 33% PC | 3.8 |
| Total | 100 |

The milk was then heated to a temperature of 50° C. to 60° C. to melt the fat globules properly. Once the temperature had been reached, the 10 liters were homogenized in a MICROFLUIDIZER®. This broke the fat globules by passing the milk in capillaries through a screen and at a pressure of 350 bar.

A MEMMERT® water bath was prepared and adjusted to 103° C. The milk was transferred into 8 1 liter bottles, weighing the quantity placed in each bottle accurately.

The bottles were immersed to the base of the neck in the water bath at 103° C. for 35 minutes then 10 minutes at 95° C. in the same water bath.

The bottles were cooled in a continuous flow cold water bath then stored at 4° C. in a refrigerator for 12 to 24 hours until use.

Inoculation of Dairy Mixes:

The milk bottles were removed from the refrigerator 45 minutes before inoculation of the ferments and placed in a water bath at the fermentation temperature (37° C.).

Four distinct inoculations of the dairy mix were carried out:

I-2494 G4I Cys-HCl granules;

I-2494 T reference granules;

BB12 G4I Cys-HCl granules;

BB12 T reference granules.

Each inoculation was carried out in an amount of 0.2 grams of granules per liter of dairy mix.

The bottles were re-immersed in the water bath (37° C.) and the change in pH was monitored over time (CINAC® apparatus from YSEBAERT®).

Results:

For *B. animalis lactis* I-2494, as for *B. animalis lactis* BB12®, a degradation in the physiological condition of the probiotic was observed due to the presence of cysteine-HCl in the granules (physiological time=time necessary for bacteria to reduce the pH by 0.08 pH units; this provides a measure of the metabolic activity recovery of these bacteria).

Figure 3:
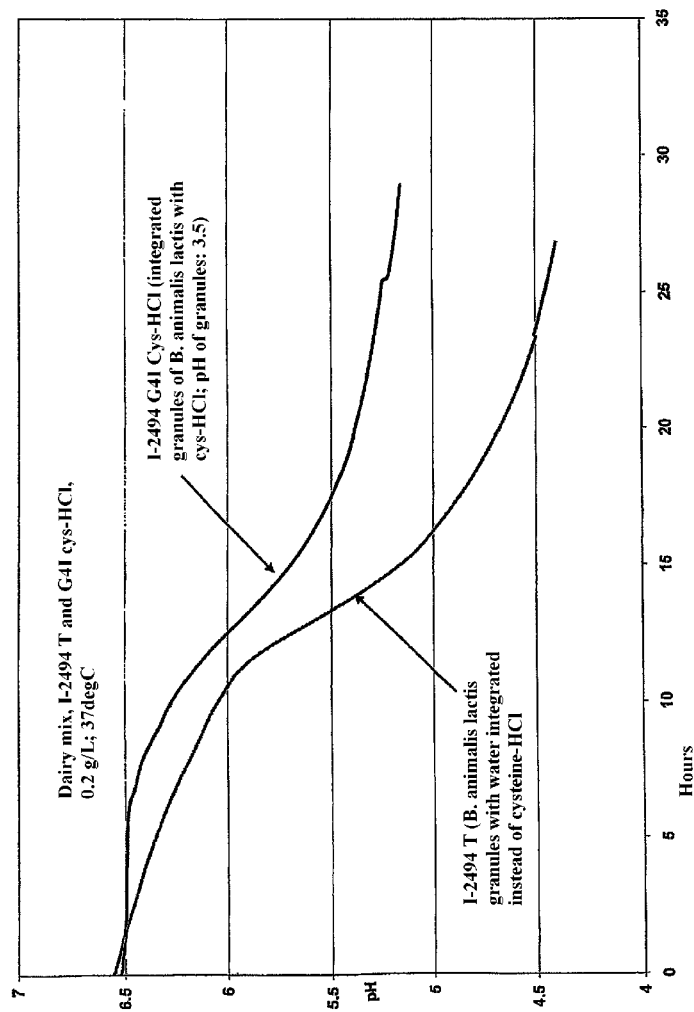
FIG. 3: change in pH over time for a dairy mix inoculated with:
granules of *Bifidobacterium animalis lactis* strain I-2494 (reference curve, bottom); or with
integrated granules containing both *Bifidobacterium animalis lactis* strain I-2494 and cysteine-HCl (upper curve);
illustrating the degradation in the physiological condition which is undergone by the probiotic *Bifidobacterium animalis lactis* when it is formulated with cysteine-HCl in the same granules (integrated formulation with cysteine-HCl).

These results are shown in FIG. 3 (I-2494 G4I, compared with I-2494 T).

The activity of the probiotic *B. animalis lactis* was greatly affected by adding cysteine-HCl to the granules of probiotic (increase of Ta).

Cysteine-HCl is not a satisfactory source of cysteine for the manufacture of integrated granules, which comprise *B. ani-*

*malis lactis* and cysteine in the same granules, and which are intended for the manufacture of fermented dairy products with a high probiotic value.

The integrated solution (*B. animalis lactis* granules+cysteine) cannot be used with cysteine-HCl as it renders the metabolic activity of the probiotic ferment inappropriate.

In view of these results, it will be observed that the pH of a cysteine-HCl solution is less than 3.5; more particularly, the pH of a cysteine-HCl solution in a concentration of 1 g in 100 mL of $H_2O$ is 1.5 to 2.0, and that the probiotic *B. animalis lactis* is particularly sensitive to low pHs, even when the contact time is reduced.

It is thus necessary to identify a source of cysteine which can be assimilated by *B. animalis lactis*, which is suitable for human consumption, and which has a pH in solution which does not stress *B. animalis lactis*.

Example 2

Selection of an L-Cysteine Base which is Suitable for the Production of Highly Effective "Integrated" Granules Despite Problems Linked to Low Solubility of this Form of Cysteine The procedure was comparable to that described in Example 1 above, but L-cysteine base (L-cysteine; $C_3H_7NO_2S$; CAS number: 52-90-4; molar mass: 121.16) was selected instead of and in place of the cysteine-HCl.

L-cysteine base is available from Ajinomoto Aminoscience LLC, Raleigh N.C. 27610, USA.

The solubility of said cysteine base is 16 g per 100 g of $H_2O$ at 20° C.

The pH of a solution containing 1.15 g of cysteine base per 50 mL of $H_2O$ is 4.5 to 5.5.

A stock solution was prepared containing 160 g/L of cysteine base and 3 grams of this stock solution was mixed with 10 grams of *B. animalis lactis* ferment (*B. animalis lactis* strain I-2494 or strain BB12®) which was formulated into frozen granules (I-2494 G4I Cys-base; and BB12 G4I Cys-base) as described in Example 1 above.

Reference granules I-2494 T and BB12 T were prepared using 3 grams of water instead of and in place of the cysteine base.

Figure 4:
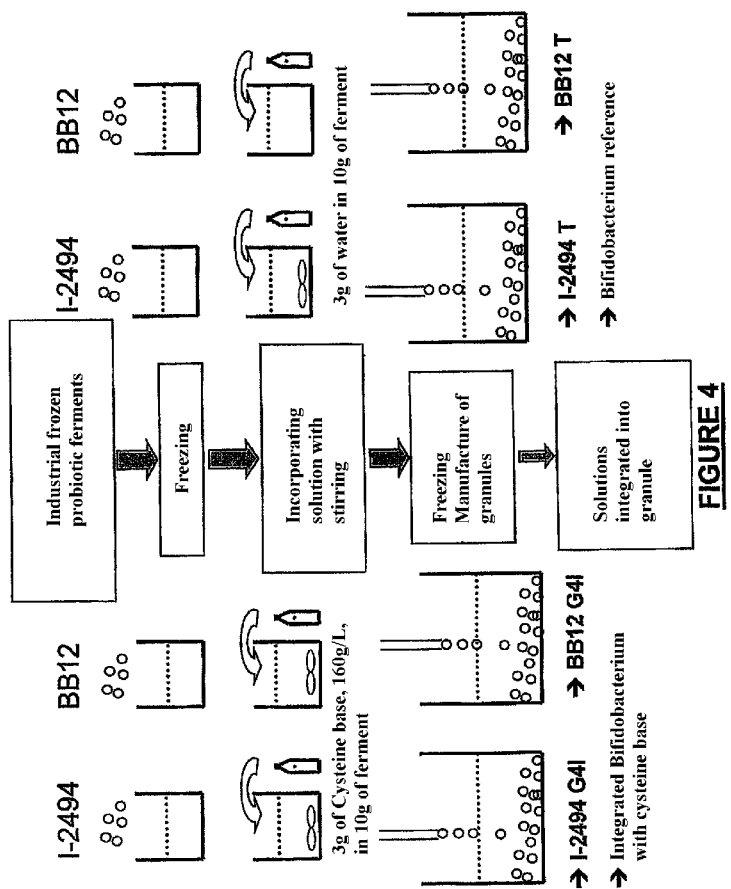
FIG. 4: flow diagram for the production of integrated granules (cysteine base+probiotic ferment(s): *Bifidobacterium animalis lactis* strain I-2494 or strain BB122 ferment, formulated into integrated granules, containing both probiotic ferment and cysteine, the cysteine here being cysteine base.

The manufacturing diagram for these granules is shown in FIG. 4.

Four distinct inoculations of 0.2 g/L of dairy mix were carried out, as described in Example 1 above.

The quantity of cysteine base contained in the G4I granules was thus in this case:

(160×3)/(3+10)=36.92 milligrams of cysteine base per gram of frozen G4I granules.

In this test, the quantity of *B. animalis lactis* was approximately $2 \times 10^{10}$ cfu per gram of frozen G4I or G4 granules (I-2494 or BB12).

Thus, in this case 1.85 mg of cysteine, $C_3H_7NO_2S$, was added per billion cfu of *B. animalis lactis* ferment.

The quantity of cysteine base added to the dairy mix by the G4I granules inoculated to a concentration of 0.2 g/L was 0.2×36.92=7.384 mg of cysteine per liter of dairy mix.

The results of incubating the mixes at 37° C. show that selecting cysteine base can prevent the physiological condition of the probiotic ferment from degrading to too great an extent.

Figure 5:
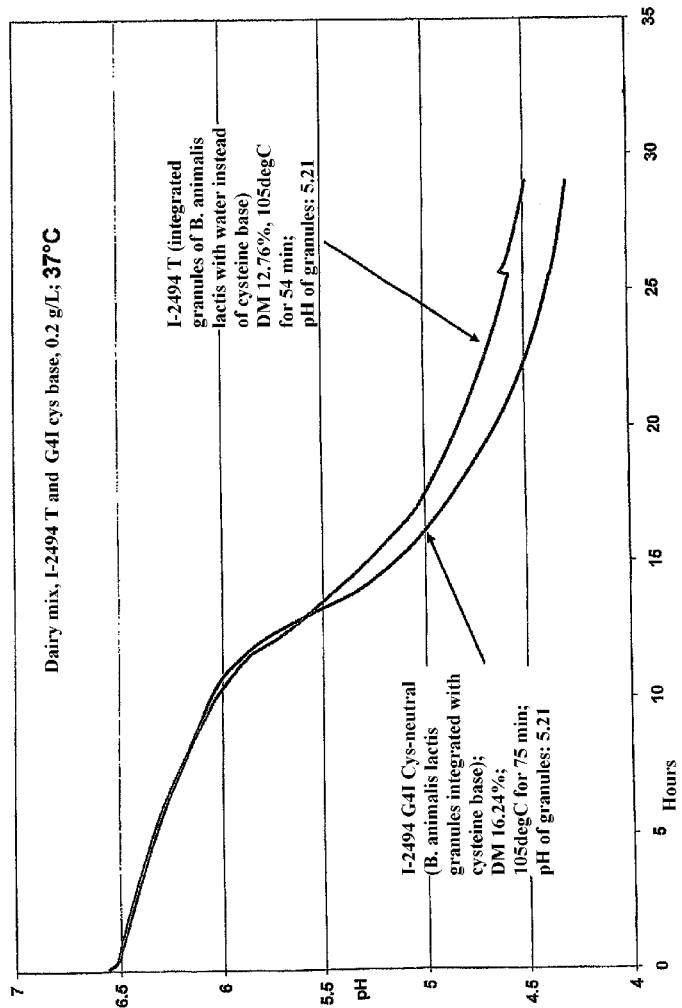
FIG. 5: change in pH over time for a dairy mix inoculated with:
granules of *Bifidobacterium animalis lactis* strain I-2494 (reference curve, top); or with
integrated granules containing both *Bifidobacterium animalis lactis* strain I-2494 and cysteine base (lower curve);
illustrating the fact that selecting cysteine base for the formulation of integrated granules of (*Bifidobacterium animalis lactis*+cysteine) means that the physiological condition of this probiotic is not deteriorated.

These results are illustrated in FIG. 5 (strain I-2494).

The "integrated cysteine granules" process (*B. animalis lactis*+cysteine granules) may be carried out with L-cysteine base, as *B. animalis lactis* retains its proper metabolic activity thereby.

Example 3

Performance of Integrated G4I Cys-Base System Firstly Compared with the Combined G4 System (Cysteine Granules Distinct from Probiotic Ferment Granules) and Secondly Compared with a Reference System (T Granules, No Cysteine)

In this example, granules of *B. animalis lactis* ferment produced as described in Example 2 were used, namely:
BB12 T granules (reference granules containing *B. animalis lactis* BB12®+water);
BB12 G4I granules (integrated granules containing *B. animalis lactis* BB12®+L-cysteine base in a concentration of approximately 1.85 mg of L-cysteine, $C_3H_7NO_2S$, per billion cfu of probiotic ferment);
I-2494 T granules (reference granules containing *B. animalis lactis* I-2494+water); and
I-2494 G4I granules (integrated granules containing *B. animalis lactis* I-2494+L-cysteine base in an amount of approximately 1.85 mg of cysteine, $C_3H_7NO_2S$, per billion cfu of probiotic ferment).

In this example, ferments termed technical ferments were also used; they were ferments of *S. thermophilus* and *Lactobacillus delbrueckli* ssp *bulgaricus*.

The technical ferments used here corresponded to a mixture of three technical strains, namely the I-1630 strain of *S. thermophilus* and strains I-1632 and I-1519 of *L. bulgaricus* (strains available from CNCM).

The technical ferments were supplied in the form of frozen granules.

The technical ferments were inoculated into the dairy mix to an amount of approximately $1 \times 10^6$ cfu of *S. thermophilus* I-1630, and approximately $2.7 \times 10^5$ cfu of *L. bulgaricus* (with 5% of strain I-1632 and 95% of strain I-1519) per gram of dairy substrate.

Six dairy mixes were prepared as described in Example 1 and inoculated as follows:
mix BB12 T and mix I-2494 T: reference mixes inoculated by a mixture of granules of technical ferments and BB12 T or I-2494 T granules respectively (granules containing the probiotic *B. animalis lactis* with no cysteine);
mix BB12 G4 and mixture I-2494 G4: mix for the combined process, inoculated as for the reference mixes and in which frozen cysteine granules were also added;
mix BB12 G4I and mix I-2494 G4I: "integrated" process mix inoculated by a mixture of granules of technical ferments and BB12 G4I or I-2494 G4I granules respectively (granules of *B. animalis lactis* containing cysteine in integrated form).

The mixes were inoculated in an amount of 0.5 g/L of a mixture of granules (0.3 g/L of technical ferments and 0.2 g/L of granules of probiotic ferment *B. animalis lactis*).

The cysteine granules of the G4 mix were added so as to supply 7.5 mg/L of cysteine to the mix, i.e. a quantity of cysteine comparable to that provided by the G4I granules (calculated value 7.384 mg/L of cysteine; see Example 2 above).

The six inoculated mixes were incubated at 37° C. as described in Example 1.

The bottle was cooled and stored at 20° C. Next, "breaking" of the bottle was carried out manually.

Packaging into 125 mL pots was carried out manually and the closure was heat sealed with a DNV-100-25 PPV-A® heat sealer from FESTO®. The products were stored in a cold room at 10° C. throughout the duration of the test.

The pH was measured during the fermentation period as well as the change in the biomass (cfu/mL as a function of number of days) during storage of the dairy product at 10° C.

The results are shown in FIGS. 6 to 9.

Strain BB12 of B. animalis lactis provided results which were entirely comparable with those of strain I-2494.

Figure 6:
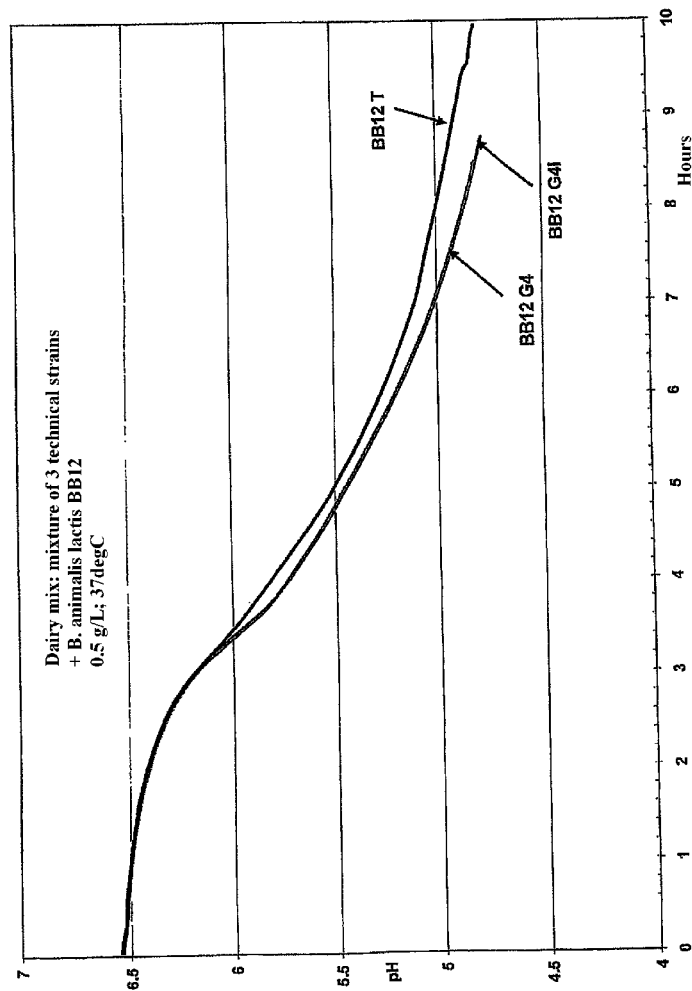
FIGS. 6 to 9: comparison of dairy mixes;
which are inoculated to 0.5 g/L using frozen granules of technical ferments (mixture of granules of *S. thermophilus* I-1630, *L. bulgaricus*—I-1632 and *L. bulgaricus* I-1519) and frozen granules of probiotic ferment *Bifidobacterium animalis lactis* (strain BB12® or strain I-2494); and
to which cysteine base has been added in the form of granules of cysteine distinct from the granules of probiotic ferment (combined solution G4), or in the integrated form with granules of probiotic ferment (integrated solution G4I), compared with the reference mix to which water has been added instead of and in place of the integrated cysteine.
Figure 7:
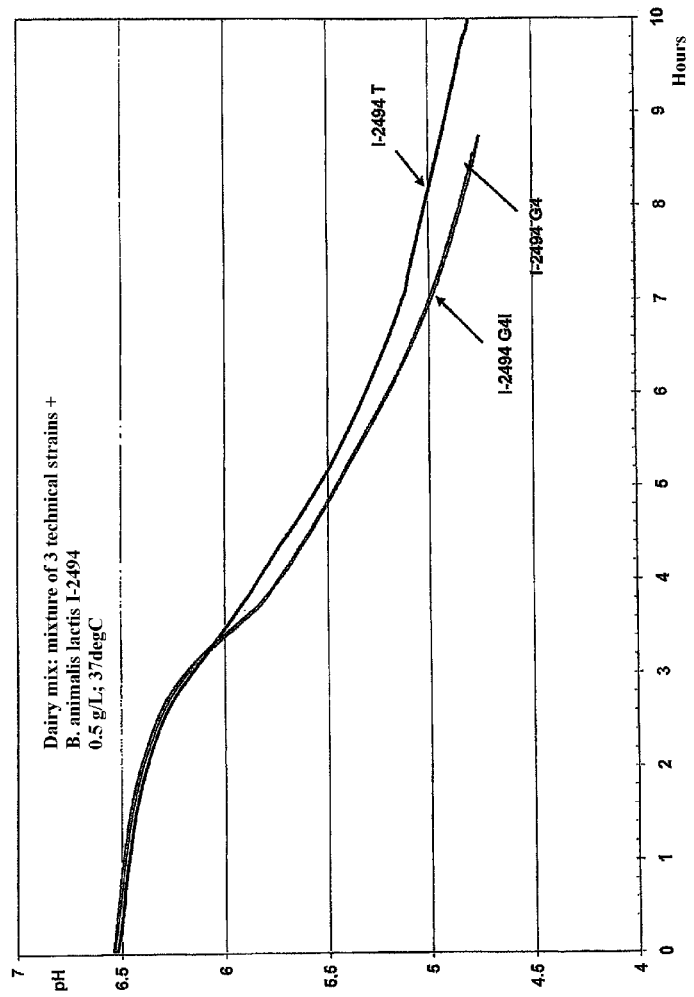

In FIGS. 6 and 7 (change of pH as a function of time in hours), it was observed that the presence of cysteine induced a difference in Vmax compared with the reference mix. The effect of the cysteine was thus visible on the acidification kinetics of B. animalis lactis.

It was also observed that the G4I mixes (L-cysteine base integrated into granules of B. animalis lactis) provided kinetics which were entirely comparable with those of the G4 mixes (granules of L-cysteine base distinct from granules of B. animalis lactis). Thus, the integration of a growth factor was completely successful.

Tables 2 and 3 below show the values for several parameters of the acidification kinetics presented in FIGS. 6 and 7.

TABLE 2

(BB12 acidification kinetics of FIG. 6)

| Technical ferments with | Ta | Vmax | pHm | Tmax | pH 0 | TpH 5.5 | TpH 5 |
|---|---|---|---|---|---|---|---|
| BB12 T | 105 | −0.0069 | 5.97 | 196 | 6.43 | 277 | 417 |
| BB12 G4 | 100 | −0.0094 | 5.88 | 216 | 6.54 | 289 | 425 |
| BB12 G4I | 102 | −0.0096 | 5.88 | 218 | 6.55 | 288 | 423 |

TABLE 3

(I-2494 acidification kinetics of FIG. 7)

| Technical ferments with | Ta | Vmax | pHm | Tmax | pH 0 | TpH 5.5 | TpH 5 |
|---|---|---|---|---|---|---|---|
| I-2494 T | 97 | −0.0060 | 6.13 | 185 | 6.52 | 309 | 489 |
| I-2494 G4 | 95 | −0.0095 | 5.87 | 218 | 6.53 | 290 | 418 |
| I-2494 G4I | 98 | −0.0092 | 5.88 | 219 | 6.54 | 289 | 419 |

Ta latency period (min);
Vmax maximum rate (pH units/min);
pHm pH at maximum acidification rate;
Tmax time to reach Vmax (min);
pH0 pH at start of fermentation;
TpH5.5 time to reach pH 5.5 (min);
TpH5 time to reach pH 5 (min).

FIGS. 8 and 9 show the change in the cell population of the probiotic ferment B. animalis lactis BB12 in FIG. 8 and B. animalis lactis probiotic I-2494 in FIG. 9 during storage of the fermented dairy product (S. thermophilus–L. bulgaricus symbiosis in addition to B. animalis lactis) at a temperature of 10° C.

These cell population graphs confirm the results observed with the acidification kinetics presented in FIGS. 6 and 7.

The presence of L-cysteine clearly stimulates the cell population of probiotic and the integration of L-cysteine base was completely successful for each of the two strains of B. animalis represented.

Thus, compared with the "combined" G4 system (granules of B. animalis lactis probiotic ferment+distinct granules of L-cysteine base), the "integrated" G4I granules of L-cysteine base were also effective: they could lead to symbiotic lactic fermentation (S. thermophilus+L. bulgaricus) which was of at least as good a quality and could generate a cell population of B. animalis lactis probiotic ferment which was entirely comparable in size and which was maintained for the same length of time during storage of the fermented milk.

Thus, selection of L-cysteine base could result in successful integration of the specific growth activator of B. animalis lactis.

The "integrated" G4I granules containing B. animalis lactis probiotic ferment and L-cysteine base and the "combined" G4 granules (granules of L-cysteine base distinct from the granules of probiotic) were much more effective than the reference system without cysteine (T granules): they led to symbiotic lactic fermentation (S. thermophilus+L. bulgaricus) at a quality which was at least comparable while generating a cell population of probiotic B. animalis lactis ferment which was much higher and which was maintained for a much longer period during storage of the fermented milk.

The invention claimed is:

1. A process for producing a fermented dairy product with a high probiotic value, which comprises:
   inoculating a dairy substrate with at least one inoculum;
   inoculating said dairy substrate with at least one strain of S. thermophilus and at least one strain of L. bulgaricus; and
   fermenting said substrate with said at least one inoculum and said strains of S. thermophilus and L. bulgaricus,
   wherein said inoculum comprises, as a mixture or in the form of a kit of parts:
   cysteine which is not bound to other amino acids via a peptide linkage; and
   at least one strain of B. animalis spp. lactis;
   said cysteine and said at least one strain of B. animalis ssp. lactis each being contained in or in the form of frozen granules and/or lyophilisate(s);
   said cysteine also being an L-cysteine base the formula for which, in the reduced form, is $HSCH_2CH(NH_2)CO_2H$, such that a solution obtained after defrosting said granule(s) and/or re-dissolving said lyophilisate(s) in a proportion of 1 to 2 grams of lyophilisate(s) per 8 to 10 mL of $H_2O$ has a pH of at least 4;
   said cysteine being present in said inoculum in a quantity of:
   1 gram per $1 \times 10^{14}$ cfu of said at least one strain of B. animalis spp. lactis (or, if there are several, said strains of B. animalis spp. lactis);
   to 1 gram per $3.5 \times 10^{10}$ cfu of said at least one strain of B. animalis spp. lactis (or, if there are several, said strains of B. animalis spp. lactis),
   and wherein the dairy substrate is supplied with up to 20 mg of cysteine per liter of dairy subtrate.

2. The process of claim 1, wherein said cysteine is an L-cysteine which has a pH of more than 4 when it is in solution.

3. The process of claim 1, which does not comprise cysteine hydrochloride.

4. The process of claim 1, wherein said inoculum comprises at least one frozen granule and/or a lyophilisate, which contains both:
   all or a portion of said cysteine; and
   cells of said at least one strain of B. animalis spp. lactis.

5. The process of claim 1, wherein said inoculum comprises:
   at least two frozen granules; or
   at least two distinct lyophilisates; or
   at least one frozen granule and at least one lyophilisate;
   and wherein for each of these pairs of physical entities:

one of the two physical entities contains all or part of said cysteine without containing cells of *B. animalis lactis*; and the other of the two physical entities contains cells of *B. animalis lactis* without containing said cysteine.

6. The process of claim 1, wherein said cysteine is present in said inoculum in a quantity of:

1 gram per $0.2 \times 10^{14}$ cfu of said at least one strain of *B. animalis* spp. *lactis* (or, if there are several, said strains of *B. animalis* spp. *lactis*);

to 1 gram per $10 \times 10^{10}$ cfu of said at least one strain of *B. animalis* spp. *lactis* (or, if there are several, said strains of *B. animalis* spp.*lactis*).

7. The process of claim 1, wherein said cysteine is present in said inoculum in a quantity of:

0.05 milligrams per billion cfu of said at least one strain of *B. animalis* spp. *lactis* (or, if there are several, said strains of *B. animalis* spp. *lactis*);

to 10 milligrams per billion cfu of said at least one strain of *B. animalis* spp. *lactis* (or, if there are several, said strains of *B. animalis* spp. *lactis*).

8. The process of claim 1, wherein 1 gram of said granules with 16-17% dry matter content comprises $5 \times 10^9$ to $5 \times 10^{11}$ cfu of said at least one strain of *B. animalis* spp. *lactis*.

9. The process of claim 1, wherein 1 gram of said granules with 16-17% dry matter content comprises 4.90 mg to 144 mg of said cysteine.

10. The process of claim 1, wherein the inoculum contains no more than 0.5% (w/w) of yeast, yeast extract or yeast autolysate.

11. The process of claim 1, wherein said strain of *B. animalis* spp. *lactis* is strain I-2494.

12. The process of claim 1, wherein the inoculum further comprises at least one strain of lactic bacteria other than *B. animalis* spp. *lactis*.

13. The process of claim 12, wherein said at least one other strain of lactic bacteria is present in a physical structure which is distinct from that which contains the cells of *B. animalis* spp. *lactis*.

14. The process of claim 1, wherein said inoculum is added to the dairy substrate in a quantity which adds L-cysteine and cells of *B. animalis* spp. *lactis* in a quantity of 7 to 11 mg of L-cysteine per liter of dairy substrate, for $10^9$ to $10^{11}$ cfu of cells of *B. animalis* spp. *lactis* per liter of dairy substrate.

15. The process of claim 4, wherein the inoculum is inoculated at a dose of 0.05 g to 1 g for 1 liter of dairy substrate.

16. The process of claim 15, where the dose is approximately 0.2 g.

* * * * *